(12) United States Patent
Ito et al.

(10) Patent No.: US 10,723,105 B2
(45) Date of Patent: Jul. 28, 2020

(54) DECORATIVE LAYER-ATTACHED TRANSPARENT PLATE AND DISPLAY DEVICE

(71) Applicant: AGC Inc., Chiyoda-ku (JP)

(72) Inventors: Jun Ito, Tokyo (JP); Azusa Takai, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 57 days.

(21) Appl. No.: 16/018,280

(22) Filed: Jun. 26, 2018

(65) Prior Publication Data
US 2019/0001637 A1 Jan. 3, 2019

(30) Foreign Application Priority Data
Jun. 29, 2017 (JP) ................................. 2017-127579

(51) Int. Cl.
| | |
|---|---|
| B32B 27/08 | (2006.01) |
| B32B 27/30 | (2006.01) |
| B32B 27/36 | (2006.01) |
| B32B 27/38 | (2006.01) |
| G02F 1/1333 | (2006.01) |
| G02F 1/1335 | (2006.01) |

(52) U.S. Cl.
CPC ............ *B32B 27/08* (2013.01); *B32B 27/306* (2013.01); *B32B 27/308* (2013.01); *B32B 27/365* (2013.01); *B32B 27/38* (2013.01); *G02F 1/133308* (2013.01); *G02F 1/133502* (2013.01); *B32B 2307/4023* (2013.01); *B32B 2307/412* (2013.01); *B32B 2457/202* (2013.01); *G02F 1/133512* (2013.01); *G02F 2001/133331* (2013.01)

(58) Field of Classification Search
CPC ..................................................... B32B 27/08
USPC ............................................................. 428/98
See application file for complete search history.

(56) References Cited

U.S. PATENT DOCUMENTS

| | | | | |
|---|---|---|---|---|
| 5,588,240 A | * | 12/1996 | Zilliox | A47G 1/065 40/605 |
| 2002/0051102 A1 | * | 5/2002 | Kuroki | G02F 1/133308 349/58 |

FOREIGN PATENT DOCUMENTS

JP 2015-5049 1/2015

\* cited by examiner

*Primary Examiner* — Brent T O'Hern
(74) *Attorney, Agent, or Firm* — Oblon, McClelland, Maier & Neustadt, L.L.P.

(57) ABSTRACT

The present invention relates to a decorative layer-attached transparent plate including: a transparent plate which is formed of a visible light-transmitting material and has two main surfaces; and a decorative layer provided on one of the main surfaces, in which the decorative layer has at least one of a protrusion and a recess at an end portion thereof, in plan view as viewed from the one of the main surfaces.

20 Claims, 12 Drawing Sheets

DECORATIVE LAYER-ATTACHED TRANSPARENT PLATE AND DISPLAY DEVICE

TECHNICAL FIELD

The present invention relates to a decorative layer-attached transparent plate and a display device.

BACKGROUND ART

A car navigation system, on-vehicle information equipment such as audio, and portable communication equipment include a display device.

The display device is provided with a protective cover, which is a sheet-like transparent plate, on a front face of a display panel via an adhesive layer (Patent Document 1). The protective cover has functions of reducing external light reflection, protecting the display panel from external shock, and the like. For example, a light-shielding decorative layer with a frame shape is provided on a surface of the protective cover on a display panel side. The decorative layer has functions of concealing wiring on the display panel side, preventing illumination light from leaking from the periphery of the display panel by concealing the illumination light of backlight, and the like in addition to the function of aesthetic appearance.

Patent Document 1 JP-A-2015-5049

SUMMARY OF THE INVENTION

The decorative layer may have a color corresponding to the display panel in some cases. For example, when turning off the power of the display panel, or when the power is on but the display panel is not used, a display area is black in general. Therefore, the decorative layer may have black color in order to make the decorative layer inconspicuous, in some cases.

In the case where such a decorative layer is formed by applying and firing ink containing a decorative layer component, the decorative layer is also required to have physical properties such as hardness and adhesion to the display panel.

However, the requirements for the color and physical properties which are required for the decorative layer cannot be completely compatible with each other in some cases. In such a case, the physical properties are prioritized and thus, the desired color may not be obtained.

When the desired color is not obtained, color difference between the display panel and the decorative layer becomes conspicuous, whereby an aesthetic appearance may be impaired.

The present inventors found that the boundary between the decorative layer and a transparent plate becomes inconspicuous by forming a shape of a projection plane of the decorative layer on a main surface of the transparent plate to a line, which appears as a single line (straight line or curved line) by visual observation but is not a smooth line microscopically (in the order of µm) such as a jagged shape. Based on this finding, the present inventors accomplished the present invention.

The present invention provides a decorative layer-attached transparent plate in which the color difference at the boundary between a transparent plate and a decorative layer is less conspicuous and which satisfies the physical properties required for the decorative layer. The present invention also provides a display device using the decorative layer-attached transparent plate.

A decorative layer-attached transparent plate of the present invention includes:

a transparent plate which is formed of a visible light-transmitting material and has two main surfaces; and a decorative layer provided on one of the main surfaces, in which the decorative layer has at least one of a protrusion and a recess at an end portion thereof, in plan view as viewed from the one of the main surfaces.

In the present invention, since at least one of a protrusion and a recess is provided at the end portion of the decorative layer provided on a transparent plate, a boundary between the decorative layer and the transparent plate looks blurred in human eye.

Therefore, color difference at the boundary between the transparent plate and the decorative layer is reduced and becomes inconspicuous.

In addition, in the present invention, since the boundary between the decorative layer and the transparent plate is made inconspicuous by the planar shape of the decorative layer, it is not required to change physical properties of the decorative layer for decreasing the color difference at the boundary. Accordingly, the decorative layer satisfies the required physical properties.

In the present invention, the protrusion preferably has a full width at half maximum of 20 µm or more and 200 µm or less and a height of 20 µm or more and 100 µm or less.

In this aspect of the present invention, since the protrusion having a full width at half maximum and height which are close to, equal to, or smaller than a resolution of the human eye is provided on an end face of the decorative layer, the boundary between the transparent plate and the decorative layer looks blurred in human eye at the protrusion.

Therefore, color difference at the boundary between the transparent plate and the decorative layer is reduced and becomes inconspicuous at the protrusion.

In the present invention, in plan view, when a protrusion tangent is drawn to a peak of the protrusion, and among tangents which are drawn to the decorative layer and parallel to the protrusion tangent, a tangent having a contact point with the decorative layer closest to the peak of the protrusion is taken as a protrusion-adjacent tangent, the decorative layer preferably has:

a shortest distance between the protrusion tangent and the protrusion-adjacent tangent being 20 µm or more and 100 µm or less; and the full width at half maximum of the protrusion of 20 µm or more and 200 µm or less with respect to the shortest distance.

In this aspect of the present invention, since the protrusion having a full width at half maximum and height which are close to, equal to, or smaller than a resolution of the human eye is provided on an end face of the decorative layer, the boundary between the transparent plate and the decorative layer looks blurred in human eye at the protrusion.

Therefore, color difference at the boundary between the transparent plate and the decorative layer is reduced and becomes inconspicuous at the protrusion.

In the present invention, the recess preferably has a full width at half maximum of 20 µm or more and 200 µm or less and a depth of 20 µm or more and 100 µm or less.

In this aspect of the present invention, since the recess having a full width at half maximum and depth which are close to, equal to, or smaller than a resolution of the human eye is provided on an end face of the decorative layer, the boundary between the transparent plate and the decorative layer looks blurred in human eye at the recess.

Therefore, color difference at the boundary between the transparent plate and the decorative layer is reduced and becomes inconspicuous at the recess.

In the present invention, in plan view, when a recess tangent is drawn to a peak of the recess, and among tangents which are drawn to the decorative layer and parallel to the recess tangent, a tangent having a contact point with the decorative layer closest to the peak of the recess is taken as a recess-adjacent tangent, the decorative layer preferably has:

a shortest distance between the recess tangent and the recess-adjacent tangent being 20 µm or more and 100 µm or less; and the full width at half maximum of the recess of 20 µm or more and 200 µm or less with respect to the shortest distance.

In this aspect of the present invention, since the recess having a full width at half maximum and depth which are close to, equal to, or smaller than a resolution of the human eye is provided on an end face of the decorative layer, the boundary between the transparent plate and the decorative layer looks blurred in human eye at the recess.

Therefore, the color difference at the boundary between the transparent plate and the decorative layer is reduced and becomes inconspicuous at the recess.

In the present invention, the decorative layer preferably has a planar shape of a waveform.

In this aspect of the present invention, since the end portion of the decorative layer has a waveform and a change in transmittance of the end face is periodic, the end portion of the decorative layer looks uniformly blurred in human eye.

Therefore, the color difference at the boundary between the transparent plate and the decorative layer decreases spontaneously, and becomes inconspicuous.

In the present invention, the planar shape of the waveform has an amplitude of one cycle of preferably 20 µm or more and 100 µm or less.

In this aspect of the present invention, since the amplitude of one cycle is close to, equal to, or smaller than a resolution of the human eye, the end face of the decorative layer looks blurred in human eye in an amplitude direction of the waveform.

Therefore, the color difference at the boundary between the transparent plate and the decorative layer decreases spontaneously, and becomes inconspicuous.

In the present invention, the planar shape of the waveform has a half-wavelength of one cycle of preferably 20 µm or more and 200 µm or less.

In this aspect of the present invention, since the half-wavelength of one cycle is close to, equal to, or smaller than a resolution of the human eye, the end face of the decorative layer looks blurred in human eye in a wavelength direction of the waveform.

Therefore, the color difference at the boundary between the transparent plate and the decorative layer decreases spontaneously, and becomes inconspicuous.

In the present invention, the planar shape of the waveform is preferably any one of a sine wave, a triangular wave, and a rectangular wave.

In this aspect of the present invention, the planar shape of the waveform is a sine wave, triangular wave or rectangular wave, whereby regions with low visible light transmittance and regions with high visible light transmittance alternately and periodically appear at the end portion, corresponding to the shape of the wave. Therefore, the end face of the decorative layer looks blurred in human eye.

Therefore, the color difference at the boundary between the transparent plate and the decorative layer decreases spontaneously, and becomes inconspicuous.

In the present invention, the decorative layer preferably has a thickness which becomes thinner toward an end face side.

In this aspect of the present invention, the thickness of the end portion of the decorative layer becomes thinner toward the end face side and the transmittance increases toward the end face side.

Therefore, the color difference at the boundary between the transparent plate and the decorative layer decreases spontaneously, and becomes inconspicuous.

In the present invention, the decorative layer preferably has a planar shape of frame and the end portion is preferably an inner circumference or an outer circumference of the frame.

In this aspect of the present invention, in particular, since the color difference at a boundary between an inside of the frame and the frame can be reduced, an aesthetic appearance at the boundary between a display portion and the like on the inside of the frame and the frame is enhanced.

The decorative layer-attached transparent plate of the present invention preferably further includes an additional region which is configured to fill the recess of the decorative layer in plan view and has higher visible light transmittance than that of the decorative layer.

In this aspect of the present invention, the color difference at the boundary between the transparent plate and the decorative layer can be reduced while making the end face of the decorative layer linear in plan view.

In the present invention, the transparent plate is preferably a cover glass for a display device and the decorative layer preferably has a color corresponding to a color of the display device in a non-display state.

In this aspect of the present invention, the color difference at the boundary between a display panel and the decorative layer can be reduced. Therefore, even in the case where the requirements for the color and physical properties which are required for the decorative layer cannot be compatible with each other, there is no possibility of impairing the aesthetic appearance due to the color of the decorative layer.

In the present invention, the transparent plate is preferably made of glass.

In this aspect of the present invention, glass is used for the transparent plate, whereby the decorative layer-attached transparent plate having both high strength and good texture can be provided.

In the present invention, the glass is preferably a bent glass.

In this aspect of the present invention, since a bent glass is used for the transparent plate, even in the case where a counterpart member on which the decorative layer-attached transparent plate is mounted has a bent shape, there is no possibility of deteriorating the mounting accuracy.

In the present invention, the glass is preferably a strengthened glass.

In this aspect of the present invention, a strengthened glass is used for the glass, whereby the decorative layer-attached transparent plate excellent in strength and scratch resistance can be provided.

A display device of the present invention includes the decorative layer-attached transparent plate, a display panel, and an adhesive layer bonding the decorative layer-attached transparent plate and the display panel.

In the present invention, since in the decorative layer-attached transparent plate, the color difference at the boundary between the transparent plate and the decorative layer can be reduced, the color difference becomes inconspicuous.

Therefore, the display device excellent in aesthetic appearance can be provided.

MODE FOR CARRYING OUT THE INVENTION

Hereinafter, an embodiment of the present invention will be described with reference to the drawings.
(Configuration of Decorative Layer-Attached Transparent Plate)

First, a configuration of a decorative layer-attached transparent plate will be described.

Figure 1:
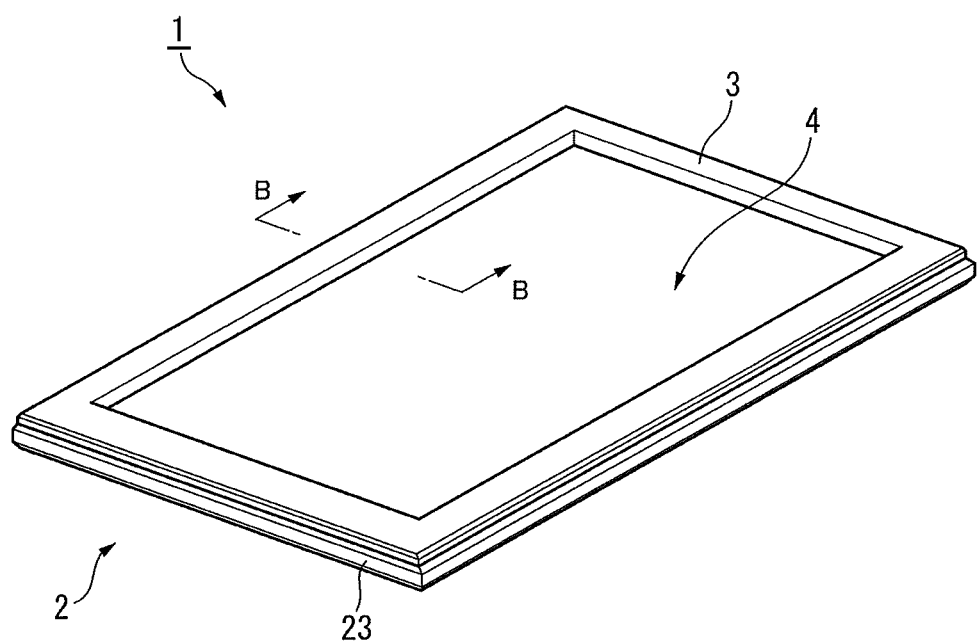
FIG. 1 is a perspective view of a decorative layer-attached transparent plate according to an embodiment of the present invention.

A decorative layer-attached transparent plate 1 illustrated in FIG. 1 includes a transparent plate 2 and a decorative layer 3.

Figure 2:
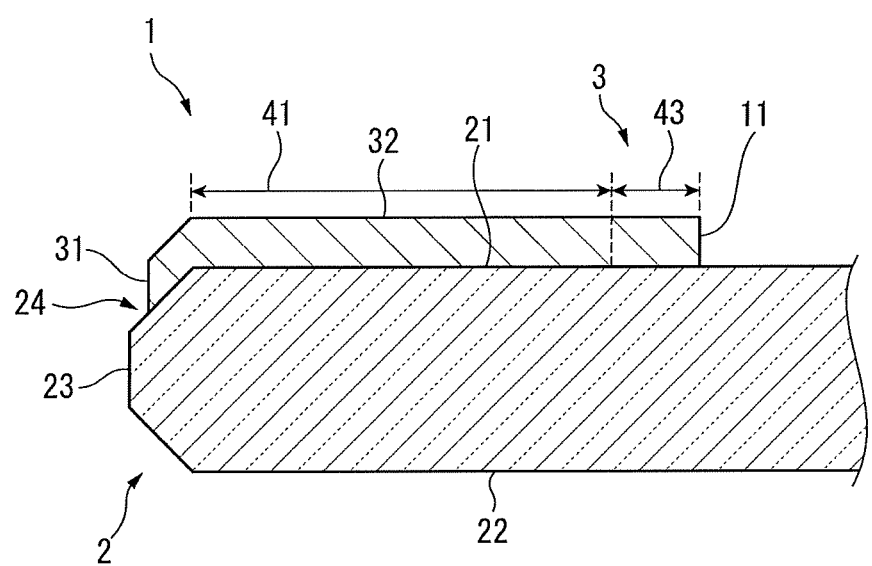
FIG. 2 is a cross-sectional view taken along the line B-B of FIG. 1.

The transparent plate 2 is a transparent strengthened glass which is rectangular in plan view and is made of a visible light-transmitting material. As illustrated in FIG. 2, the transparent plate 2 includes a first main surface 21, a second main surface 22, and end face 23. The end face 23 is provided with a chamfered portion 24.

The decorative layer 3 is provided to impart light-shielding property to the decorative layer-attached transparent plate 1 and has lower visible light transmittance than that of the transparent plate 2. In FIG. 1, the decorative layer 3 has a quadrilateral frame shape and provided on a peripheral portion of the first main surface 21 in the transparent plate 2.

As illustrated in FIG. 2, the decorative layer 3 includes a flat portion 41 of which a surface 32 is flat, and an end portion 43. A decorative layer end face 11 is formed at a boundary of the end portion 43 with the transparent plate 2. An end face 31 is also formed on the flat portion 41.

The flat portion 41 is a portion having a flat surface.

The end portion 43 is provided at an inner peripheral end portion of the flat portion 41.

The end portion 43 includes either or both of protrusions 57 and recesses 59, in plan view as viewed from the first main surface 21 which is one main surface.

Figure 3:
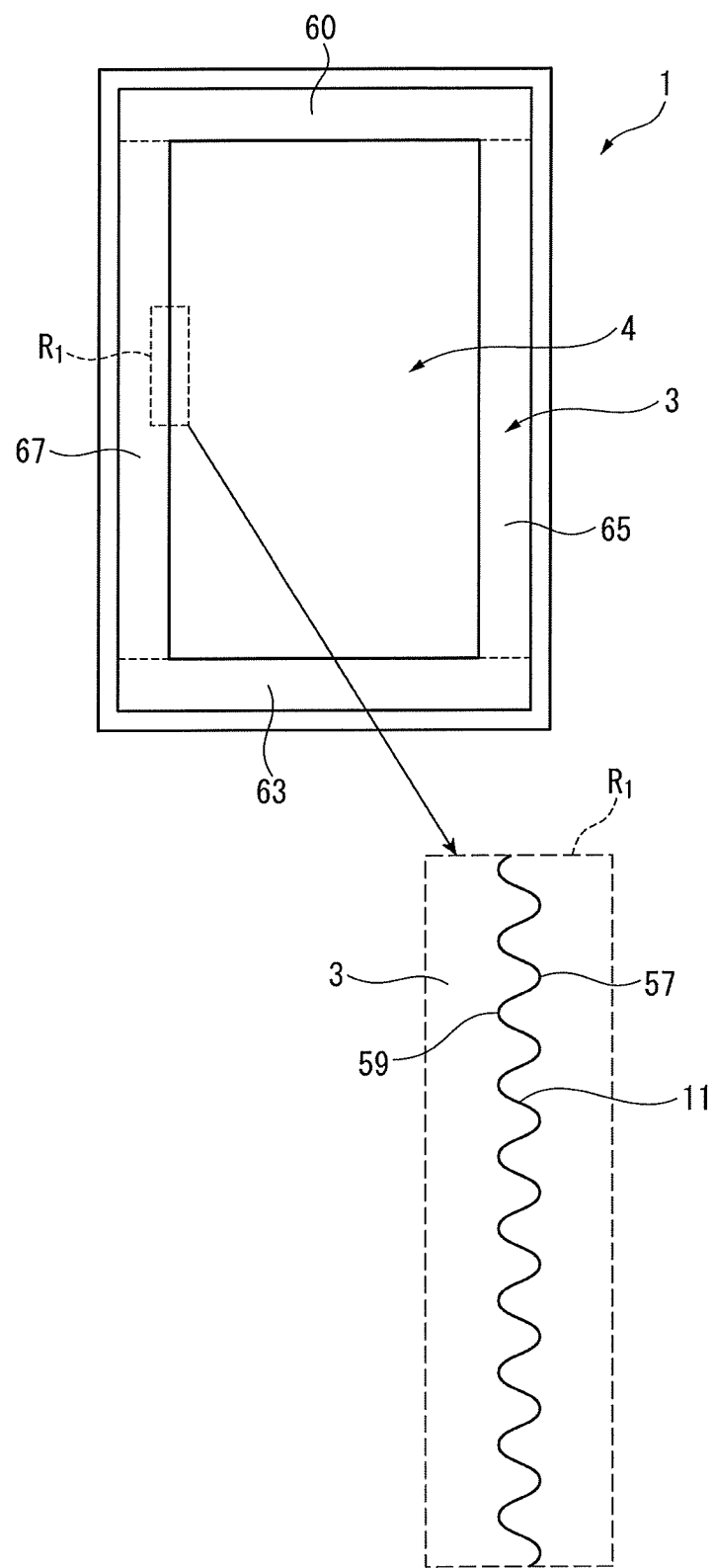
FIG. 3 includes a plan view of FIG. 1 and an enlarged view of a region $R_1$ in athe plan view.
Figure 4:
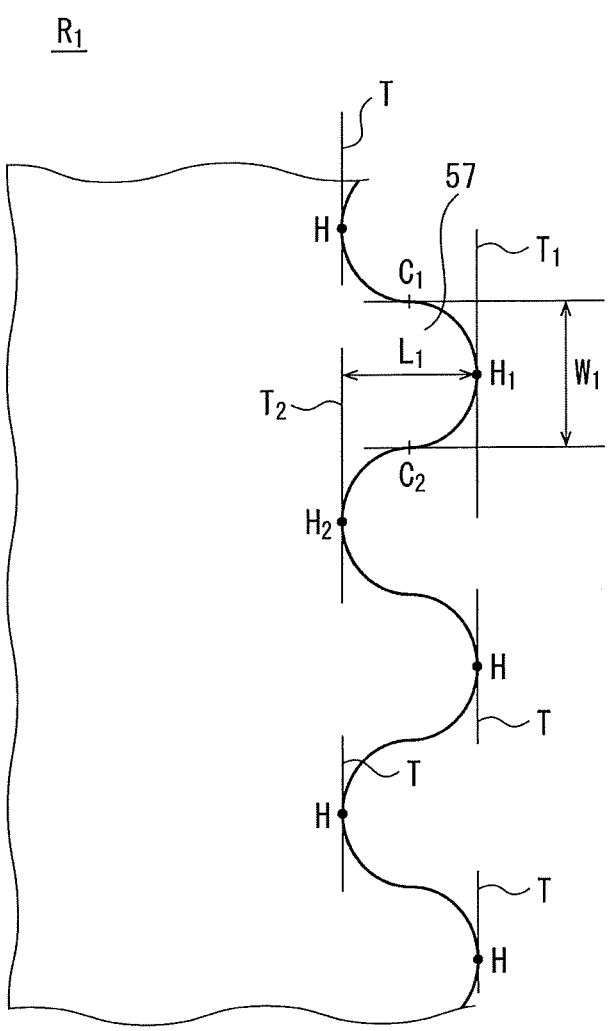
FIG. 4 is a further-enlarged view of the region $R_1$ of FIG. 3.
Figure 5:
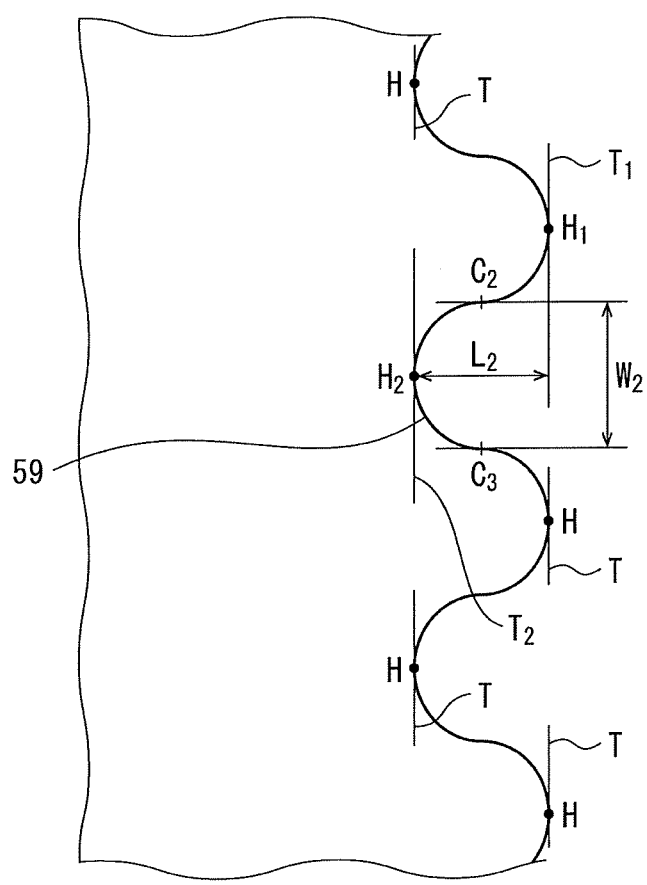
FIG. 5 is another further-enlarged view of the region $R_1$ of FIG. 3.

Here, as illustrated in FIG. 3, FIG. 4 and FIG. 5, the end portion 43 has a planar shape of a waveform. In FIG. 3, FIG. 4 and FIG. 5, the waveform is formed of a sine wave.

The protrusions 57 and recesses 59 mean portions protruding or retracting from a reference line. Therefore, in the case of a waveform, the wave can be regarded as a set of only the protrusions 57 and also as a set of only the recesses 59, depending on a position of the reference line.

For example, in FIG. 4, when the reference line is set to a tangent $T_2$, the wave is regarded as the set of only protrusions 57.

In FIG. 5, when the reference line is set to a tangent $T_1$, the wave is regarded as the set of only the recesses 59.

When the reference line is provided between $T_1$ and $T_2$, the wave is regarded to include both the protrusions 57 and recesses 59. However, in the end portion 43, the amplitude and the wavelength of the wave in plan view may not be constant, and also the number of waves is not limited. In addition, the wave may be an asymmetric form. Therefore, the reference line may be difficult to be set between $T_1$ and $T_2$, for example, as an average of the amplitudes, in some cases.

Accordingly, in the following description, the reference line is set to different positions in the case where the waveform is regarded as the set of only the protrusions 57 and in the case where the waveform is regarded as the set of only the recesses 59, and further a reference line is separately defined for one protrusion 57 or recess 59, and respective methods for specifying dimensions will be described.

First, the case where the waveform is regarded as the set of only the protrusions 57 will be described with reference to FIG. 4.

As illustrated in FIG. 4, the protrusion 57 preferably has a full width at half maximum $W_1$ of 20 μm or more and 200 μm or less and a height $L_1$ of 20 μm or more and 100 μm or less. The full width at half maximum $W_1$ and height $L_1$ are respectively the upper limit values or less, thereby becoming close to, equal to, or smaller than the resolution of the human eye, and the boundary between the transparent plate 2 and the decorative layer 3 becomes blurred and the color difference becomes inconspicuous. The full width at half maximum $W_1$ and height $L_1$ are respectively the lower limit values or more, whereby the presence of the protrusions 57 in itself can be recognized in human eye. Therefore, the boundary between the transparent plate 2 and the decorative layer 3 looks blurred.

The height $L_1$ is more preferably 20 μm or more and 80 μm or less and further preferably 30 μm or more and 70 μm or less. In the case where the height is the upper limit value or less, when a liquid crystal module is disposed to be a display device, the protrusions 57 are not visually recognized at a distance at which a viewer visually recognizes the display device, and the color difference at the boundary between the transparent plate 2 and the decorative layer 3 can be further inconspicuous. In the case where the height is the lower limit value or more, when a desired pattern is formed by an ink jet method, the protrusions 57 maintaining the stability of the pattern can be formed.

The full width at half maximum $W_1$ is more preferably 20 µm or more and 150 µm or less and further preferably 20 µm or more and 100 µm or less. In the case where the full width at half maximum $W_1$ is the upper limit value or less, when a liquid crystal module is disposed to be a display device, the boundary between the transparent plate 2 and the decorative layer 3 is difficult to be visually recognized at a distance at which a viewer visually recognizes the display device, and the color difference can be further inconspicuous.

The full width at half maximum $W_1$ and height $L_1$ are obtained as follows.

First, the tangent $T_1$ (also referred to as a protrusion tangent) is drawn to a peak $H_1$ of the protrusion 57. Next, tangents parallel to the tangent $T_1$ are drawn to the decorative layer 3, and a tangent having a contact point with the decorative layer 3 closest to $H_1$ is selected. In the illustrated case, since the contact point closest to $H_1$ is $H_2$, a tangent $T_2$ (also referred to as a protrusion-adjacent tangent) drawn to $H_2$ is selected. The other tangents T are not selected here, because distances to the contact points H from $H_1$ are farther. The shortest distance between $T_1$ and $T_2$ is the height $L_1$. A full width at half maximum of the protrusion 57 with respect to the shortest distance (height $L_1$) is the full width at half maximum $W_1$. In this case, since the wave is the sine wave, a distance between midpoints $C_1$ and $C_2$ is the full width at half maximum.

Next, the case where the waveform is regarded as the set of only the recesses 59 will be described with reference to FIG. 5.

The recesses 59 preferably has a full width at half maximum $W_2$ of 20 µm or more and 200 µm or less and a depth $L_2$ of 20 µm or more and 100 µm or less. The full width at half maximum $W_2$ and depth $L_2$ are respectively the upper limit values or less, thereby becoming close to, equal to, or smaller than the resolution of the human eye, and the boundary between the transparent plate 2 and the decorative layer 3 becomes blurred and the color difference becomes inconspicuous. The full width at half maximum $W_2$ and depth $L_2$ are respectively the lower limit values or more, whereby the presence of the recesses 59 in itself can be recognized in human eye. Therefore, the boundary between the transparent plate 2 and the decorative layer 3 looks blurred at recesses 59.

The depth $L_2$ is more preferably 20 µm or more and 80 µm or less and further preferably 30 µm or more and 70 µm or less. In the case where the depth is the upper limit value or less, when a liquid crystal module is disposed to be a display device, the recesses 59 are not visually recognized at a distance at which a viewer visually recognizes the display device, and the color difference at the boundary between the transparent plate 2 and the decorative layer 3 can be further inconspicuous. In the case where the depth is the lower limit value or more, when a desired pattern is formed by an ink jet method, the recesses 59 maintaining the stability of the pattern can be formed.

The full width at half maximum $W_2$ is more preferably 20 µm or more and 150 µm or less and further preferably 20 µm or more and 100 µm or less. In the case where the full width at half maximum $W_2$ is the upper limit value or less, when a liquid crystal module is disposed to be a display device, the boundary between the transparent plate 2 and the decorative layer 3 is difficult to be visually recognized at a distance at which a viewer visually recognizes the display device, and the color difference can be further inconspicuous.

The full width at half maximum $W_2$ and depth $L_2$ are obtained as follows.

First, the tangent $T_2$ (also referred to as a recess tangent) is drawn to a peak $H_2$ of the recess 59. Next, tangents parallel to the tangent $T_2$ are drawn to the decorative layer 3, and a tangent having a contact point with the decorative layer 3 closest to $H_2$ is selected. In the illustrated case, since the contact point closest to $H_2$ is $H_1$, a tangent $T_1$ (also referred to as a recess-adjacent tangent) drawn to $H_1$ is selected. The other tangents T are not selected here, because distances to the contact points H from $H_2$ are farther. The shortest distance between $T_2$ and $T_1$ is the depth $L_2$. A full width at half maximum of the recess 59 with respect to the shortest distance (depth $L_2$) is the full width at half maximum $W_2$. In this case, since the wave is the sine wave, a distance between midpoints $C_2$ and $C_3$ is the full width at half maximum.

In FIG. 3 to FIG. 5, since the end portion 43 has a waveform in plan view, a half-wavelength of one cycle is equal to the full width at half maximum $W_1$ or $W_2$. The amplitude is equal to the height $L_1$ or the depth $L_2$. Accordingly, the half-wavelength of one cycle is 20 µm or more and 200 µm or less, and the amplitude is 20 µm or more and 100 µm or less.

As illustrated in FIG. 1, in the decorative layer-attached transparent plate 1, a region surrounded by the decorative layer 3 is a display region 4 in which a display panel such as a liquid crystal panel is disposed. In the case where the decorative layer-attached transparent plate 1 is used for a display device (see FIG. 10), the display panel such as a liquid crystal panel is disposed on the display region 4. A wiring, circuit and the like for driving are provided on the display panel. When the display panel is visually recognized via a transparent plate 2 with no decorative layer 3, the wiring and the like are visible to impair the aesthetic appearance. Therefore, the decorative layer 3 is provided on the peripheral portion of the transparent plate 2, whereby the wiring or the like disposed in the vicinity of the outer periphery can be concealed and the aesthetic appearance is enhanced.

In addition, in the case where the display panel is a liquid crystal panel, a backlight is provided on the back of the liquid crystal panel which is not self-luminous. However, when the illumination light from the backlight leaks to the outside of the display region 4, the aesthetic appearance is impaired. Therefore, the decorative layer 3 is provided on the peripheral portion of the transparent plate 2, whereby the illumination light can be prevented from leaking from the outer periphery of the display region 4 and the aesthetic appearance is enhanced.

(Method for Manufacturing Decorative Layer-Attached Transparent Plate)

Next, a method for manufacturing the decorative layer-attached transparent plate 1 will be described.

In the present specification, the decorative layer means a layer that can impart concealing property or aesthetic property, and examples thereof include a printed layer that is formed by printing with a screen method or an ink jet method.

First, the transparent plate 2 is prepared by cutting transparent glass to have a predetermined size and chamfering. At this time, the chamfering is preferably performed such that a dimension of the chamfered portion 24 in plan view is 0.05 mm or more and 0.5 mm or less.

Thereafter, the decorative layer 3 is formed on the transparent plate 2.

A method for forming the decorative layer 3 is not particularly limited, but preferred examples thereof include an ink jet method. The ink jet method is a method in which microdroplets of ink in a liquid form are discharged from a nozzle in a pulse shape to form a pattern on the transparent plate 2. The transparent plate 2 is positioned on the basis of a starting point of a nozzle moving mechanism, the nozzle moves above the surface of the transparent plate 2 approximately in a horizontal direction while discharging the microdroplets of ink based on a command from a computer. Accordingly, dotted ink is continuously formed to form the decorative layer 3 having a predetermined pattern. In the case of the transparent plate 2 in which a surface to be printed includes a bent portion, when considering distortion or the like of the pattern, it is preferable that the distance between the nozzle discharging the ink droplets and the transparent plate 2 is substantially constant. For example, use is preferably made of a mechanism that rotates and moves the nozzle or the transparent plate 2 according to the pattern while maintaining the distance between the nozzle and the transparent plate 2 substantially constant. Since a supply pressure for supplying the ink to the nozzle is stabilized and a discharging amount of the ink from the nozzle can be maintained constant, a mechanism that fixes nozzle and rotates and moves the transparent plate 2 with respect to the nozzle is more preferably used.

In the ink jet method, the pattern is formed while linearly moving the nozzle in one direction in general. Accordingly, as illustrated in FIG. 3, in the case of frame-shape decorative layer 3, the printing is preferably performed by dividing the pattern into four linear patterns of an upper side decorative layer 60, a lower side decorative layer 63, a right side decorative layer 65, and a left side decorative layer 67.

Specifically, the transparent plate 2 is placed on a support base (not illustrated), and a discharge hole of the nozzle is positioned at a lower right end portion in FIG. 3, in the first main surface 21 of the transparent plate 2. Thereafter, the lower side decorative layer 63 illustrated in FIG. 3 is printed by moving the nozzle to a lower left end portion while discharging the ink from the discharge hole.

Next, at least one of the support base and the nozzle is moved relatively to position the discharge hole at an upper right end portion in the first main surface 21. Thereafter, the upper side decorative layer 60 as illustrated in FIG. 3 is printed by moving the nozzle to an upper left end portion while discharging the ink from the discharge hole.

Next, the discharge hole of the nozzle is positioned at an upper right end portion in FIG. 3, in the first main surface 21 of the transparent plate 2. Thereafter, the right side decorative layer 65 illustrated in FIG. 3 is printed by moving the nozzle to a lower right end portion while discharging the ink from the discharge hole.

Next, at least one of the support base and the nozzle is moved relatively to position the discharge hole at an upper left end portion in the first main surface 21. Thereafter, the left side decorative layer 67 as illustrated in FIG. 3 is printed by moving the nozzle to a lower left end portion while discharging the ink from the discharge hole.

A thickness of the decorative layer 3 can be adjusted by controlling the discharge amount of the ink from the discharge hole and the moving speed of the nozzle. In the case of thickening, the discharge amount may be increased or the moving speed may be decreased. In the case of thinning, the discharge amount may be decreased or the moving speed may be increased.

The discharge amount of the ink can be controlled by the amount of the liquid droplet discharged from the discharge hole of the nozzle and an interval (discharge pitch) for discharging. When the amount of a liquid droplet from one discharge hole is denoted by L (pL) and the discharge pitch is denoted by P (µm), L/P (pL/µm) and the discharge amount has a correlation. The L/P is preferably 7 or less. In the case where the L/P is the upper limit value or less, when the discharge amount is stable and printing is performed linear, bleeding is suppressed and the linearity is stabilized. In addition, when printing in a curved shape, ink drooping can be suppressed and a desired curved shape can be obtained. The L/P is more preferably 6 or less and further preferably 4 or less.

The L/P is preferably 0.5 or more. In the case where the L/P is the lower limit value or more, the thickness and printing quality suitable for printing or the like requiring the light shielding property are obtained and a favorable decorative layer 3 is obtained. The L/P is more preferably 0.6 or more and further preferably 0.8 or more.

The relative moving speed between the nozzle and the transparent plate 2 is preferably 250 mm/sec or less, for example. In the case where the relative moving speed between the nozzle and the transparent plate 2 is higher than the upper limit value, it is likely to be affected by the air flow or vibration occurred therebetween. Foreign matter entrapped by the air flow may be mixed to the decorative layer 3 and there is possibility of defect. In addition, there is a possibility that desired shape accuracy may not be obtained due to vibration. Therefore, the relative moving speed of the upper limit value or less is preferable. The relative moving speed is more preferably 230 mm/sec or less and further preferably 200 mm/sec or less.

The lower limit value of the relative moving speed between the nozzle and the transparent plate 2 is not particularly limited, but preferably 5 mm/sec or more. The relative moving speed affects the manufacturing time. If the relative moving speed is the lower limit value or more, the decorative layer-attached transparent plate 1 having a high quality decorative layer 3 can be manufactured with high production efficiency. The relative moving speed is more preferably 10 mm/sec or more and further preferably 20 mm/sec or more.

When a portion forming the protrusions 57 and the recesses 59 in the decorative layer 3 is printed, it is preferable that the printing pitch is narrowed and the discharge amount per hole of the ink discharge head is reduced as compared with a portion not forming the protrusions 57 and the recesses 59.

A fine pattern including the protrusions 57 and the recesses 59 can be drawn by narrowing the printing pitch. The protrusions 57 and the recesses 59 can be prevented from being crushed with the excessive amount of ink, by reducing the discharge amount of the ink.

In the present embodiment, the thicknesses of the upper side decorative layer 60, lower side decorative layer 63, right side decorative layer 65, and left side decorative layer 67 are the same as one another, and printing conditions (discharge amount of ink and nozzle moving speed) are preferably the same as one another.

A distance between the nozzle and the transparent plate 2 is preferably controlled to be 0.5 mm or more and 2 mm or less. This is because the thickness of the decorative layer 3 can be controlled within a desired range and the homogeneous decorative layer 3 can be obtained.

In addition, inks for printing the upper side decorative layer 60, lower side decorative layer 63, right side decorative layer 65, and left side decorative layer 67 are preferably the same kind of ink.

Thereafter, the decorative layer 3 is cured by performing drying and baking, to thereby obtain the decorative layer-attached transparent plate 1. Drying or baking of the upper side decorative layer 60, lower side decorative layer 63, right side decorative layer 65, and left side decorative layer 67 may be carried out each time at which the each layer is formed, or may be carried out after all layers are formed.

(Function Effect of Decorative Layer-Attached Transparent Plate)

Since either or both of the protrusions 57 and the recesses 59 are provided at the end portion 43 of the decorative layer 3 provided on the transparent plate 2, a boundary between the decorative layer 3 and the transparent plate 2 looks blurred in human eye.

Therefore, the color difference at the boundary between the transparent plate 2 and the decorative layer 3 is reduced and becomes inconspicuous, as compared with a case where the transmittance is constant.

The full width at half maximum $W_1$ of the protrusion 57 is 20 µm or more and 200 µm or less and the height $L_1$ is 20 µM or more and 100 µm or less, and these are dimensions which is close to, equal to, or smaller than the resolution of the human eye. Therefore, the boundary between the transparent plate 2 and the decorative layer 3 looks blurred in human eye, at the protrusions 57.

Therefore, the color difference at the boundary between the transparent plate 2 and the decorative layer 3 is reduced and becomes inconspicuous.

The distance (height $L_1$ of protrusion 57) between the tangents $T_1$ and $T_2$ is 20 µm or more and 100 µm or less and the full width at half maximum of the protrusion 57 is 20 µm or more and 200 µm or less. Therefore, the boundary between the transparent plate 2 and the decorative layer 3 looks blurred in human eye at the protrusions 57.

Therefore, the color difference at the boundary between the transparent plate 2 and the decorative layer 3 is reduced and becomes inconspicuous at the protrusions 57.

The full width at half maximum $W_2$ of the recess 59 is 20 µm or more and 200 µm or less and the depth $L_2$ is 20 µm or more and 100 µm or less, and these are dimensions which is close to, equal to, or smaller than the resolution of the human eye. Therefore, the boundary between the transparent plate 2 and the decorative layer 3 looks blurred for the human eye, at the recesses 59.

Therefore, the color difference at the boundary between the transparent plate 2 and the decorative layer 3 is reduced and becomes inconspicuous.

The distance (depth $L_2$ of the recess 59) between the tangents $T_2$ and $T_1$ is 20 µm or more and 100 µm or less and the full width at half maximum of the recess 59 is 20 µm or more and 200 µm or less. Therefore, the boundary between the transparent plate 2 and the decorative layer 3 looks blurred in human eye, at the recesses 59.

Therefore, the color difference at the boundary between the transparent plate 2 and the decorative layer 3 is reduced and becomes inconspicuous at the recesses 59.

Since the decorative layer 3 has a planar shape of the waveform and a change in transmittance of the end portion 43 is periodic, the boundary between the transparent plate 2 and the decorative layer 3 looks uniformly blurred in human eye.

Therefore, the color difference at the boundary between the transparent plate 2 and the decorative layer 3 is reduced spontaneously, and becomes inconspicuous.

Since in the planar shape of the waveform of the end portion 43, the amplitude of one cycle is 20 µm or more and 100 µm or less, and this is close to, equal to, or smaller than the resolution of the human eye, the boundary between the transparent plate 2 and the decorative layer 3 looks blurred in human eye in the amplitude direction of the waveform.

Therefore, the color difference at the boundary between the transparent plate 2 and the decorative layer 3 is reduced spontaneously, and becomes inconspicuous.

Since in the planar shape of the waveform, the half-wavelength of one cycle is 20 µm or more and 200 µm or less, and this is close to, equal to, or smaller than the resolution of the human eye, the boundary between the transparent plate 2 and the decorative layer 3 looks blurred in human eye in a wavelength direction of the waveform.

Therefore, the color difference at the boundary between the transparent plate 2 and the decorative layer 3 is reduced spontaneously and becomes inconspicuous.

Since the decorative layer 3 has a planar shape of a frame, the end portion 43 is an inner periphery of the frame, and the color difference at a boundary between an inside of the frame and the frame can be reduced, the aesthetic appearance at the boundary between the display region 4 on the inside of the frame and the frame is enhanced.

Since the transparent plate 2 is a strengthened glass, the decorative layer-attached transparent plate 1 is excellent in strength and scratch resistance.

Modified Example

The present invention is not limited only to the above-described embodiments, and various improvements, design modifications and the like can be made within a range without departing from the gist of the present invention. Specific procedures, structures and the like when carrying out the present invention may adopt other structures or the like within a range where the object of the present invention can be achieved.

For example, as the transparent plate 2, a plate with various shapes and materials can be used according to applications.

Examples of the shape may include not only a plate having only the flat surface, but also a plate having a curved face at least on a portion and a plate having a recess. For example, in the case where the transparent plate 2 is made of glass, a bent glass may be used. In the case where a bent glass is used for the transparent plate 2, even when a counterpart member on which the decorative layer-attached transparent plate 1 is mounted has a bent shape, there is no possibility of deteriorating the mounting accuracy. In addition, the transparent plate 2 may also be a film shape.

The material only has to be transparent, and use can be made of general glass such as inorganic glass and organic glass such as polycarbonate glass or acryl glass. Other synthetic resins and the like can also be used.

In the case where an inorganic glass is used for the transparent plate 2, a thickness thereof is preferably 0.5 mm or more and 5 mm or less. Glass having a thickness of the lower limit value or more, there is an advantage that the decorative layer-attached transparent plate 1 having both high strength and good texture can be obtained. In addition, in the case of using an inorganic glass, the thickness thereof is more preferably 0.7 mm or more and 3 mm or less, and further preferably 1 mm or more and 3 mm or less.

In the case where an organic glass or synthetic resin is used for the transparent plate 2, the configuration may be made of laminated base materials regardless of the same kinds or different kinds, and various adhesive layers may be inserted between base materials.

In the case where an inorganic glass is used for the transparent plate 2, either chemical strengthening treatment or physical strengthening treatment may be carried out, and the chemical strengthening treatment is preferably carried out. In the case where a relatively thin inorganic glass as described above is subjected to strengthening treatment, the chemical strengthening treatment is appropriate.

An anti-glare treatment (AG treatment), an anti-reflection treatment (AR treatment), an anti-fingerprint treatment (AFP treatment), and the like are preferably performed on at least one of the first main surface 21 and the second main surface 22 of the transparent plate 2. A primer treatment, an etching treatment or the like may also be performed on the first main surface 21 and the chamfered portion 24 on which the decorative layer 3 is provided, in order to improve the adhesion to the decorative layer 3.

The ink forming the decorative layer 3 may be an inorganic ink or an organic ink. Examples of the inorganic ink may include a composition containing one or more selected from $SiO_2$, $ZnO$, $B_2O_3$, $Bi_2O_3$, $Li_2O$, $Na_2O$, and $K_2O$, one or more selected from $CuO$, $Al_2O_3$, $ZrO_2$, $SnO_2$, and $CeO_2$, and $Fe_2O_3$, and $TiO_2$.

Various printing materials obtained by dissolving resin in a solvent can be used as the organic ink. As the resin, for example, use can be made of at least one resin selected from the group consisting of resins such as acrylic resin, urethane resin, epoxy resin, polyester resin, polyamide resin, vinyl acetate resin, phenol resin, olefins, ethylene-vinyl acetate copolymer resin, polyvinyl acetal resin, natural rubber, a styrene-butadiene copolymer, an acrylonitrile-butadiene copolymer, polyester polyol, and polyether polyurethane polyol. As the solvent, water, alcohols, esters, ketones, aromatic hydrocarbon solvents, and aliphatic hydrocarbon solvents may be used. As the alcohols, for example, isopropyl alcohol, methanol, ethanol, and the like can be used. Ethyl acetate can be used as the esters and methyl ethyl ketone can be used as the ketones. As the aromatic hydrocarbon solvents, toluene, xylene, Solvesso™ 100, Solvesso™ 150, and the like can be used. As the aliphatic hydrocarbon solvents, hexane and the like can be used. These are given as examples and various printing materials in addition to these can be used. The decorative layer 3 formed of the resin can be formed by applying the organic printing material to the transparent plate 2 and then evaporating the solvent. A thermosetting ink which can be cured by heating may be used, a UV curable ink may be also used, and there is no particular limitation.

The ink used for the decorative layer 3 may contain a colorant. For example, in the case where the decorative layer 3 is formed to be black, a black colorant such as carbon black can be used as the colorant. In addition, a colorant having an appropriate color corresponding to a desired color can be used.

The decorative layer 3 may be laminated a desired number of times. The inks to be used for printing may be different in each layer. In addition, the decorative layer 3 may be printed not only one main surface but also on the other main surface, and may be further printed on the end face.

In the case where the decorative layers 3 is laminated a desired number of times, different inks may be used in each layer. For example, in the case where the decorative layer 3 is intended to look white when a user views the decorative layer-attached transparent plate 1 from the second main surface 22 side, a first layer is printed in white, and then, a second layer may be printed in black. Accordingly, when the user views the decorative layer 3 from the second main surface 22 side, a white decorative layer 3 in which so-called "sense of sheer" related to the visibility of the back side of the decorative layer 3 is suppressed can be formed.

The planar shape of the decorative layer 3 may be a linear along one side of the first main surface 21, an L-shape along two consecutive sides, and two straight shapes along two opposite sides. In the case where the first main surface 21 is a polygon other than a quadrangle, a circular shape, or an irregular shape, the decorative layer 3 may have a frame shape corresponding to these shapes, a linear shape along one side of the polygon, or a circular arc shape along a part of the circular shape.

Figure 6:
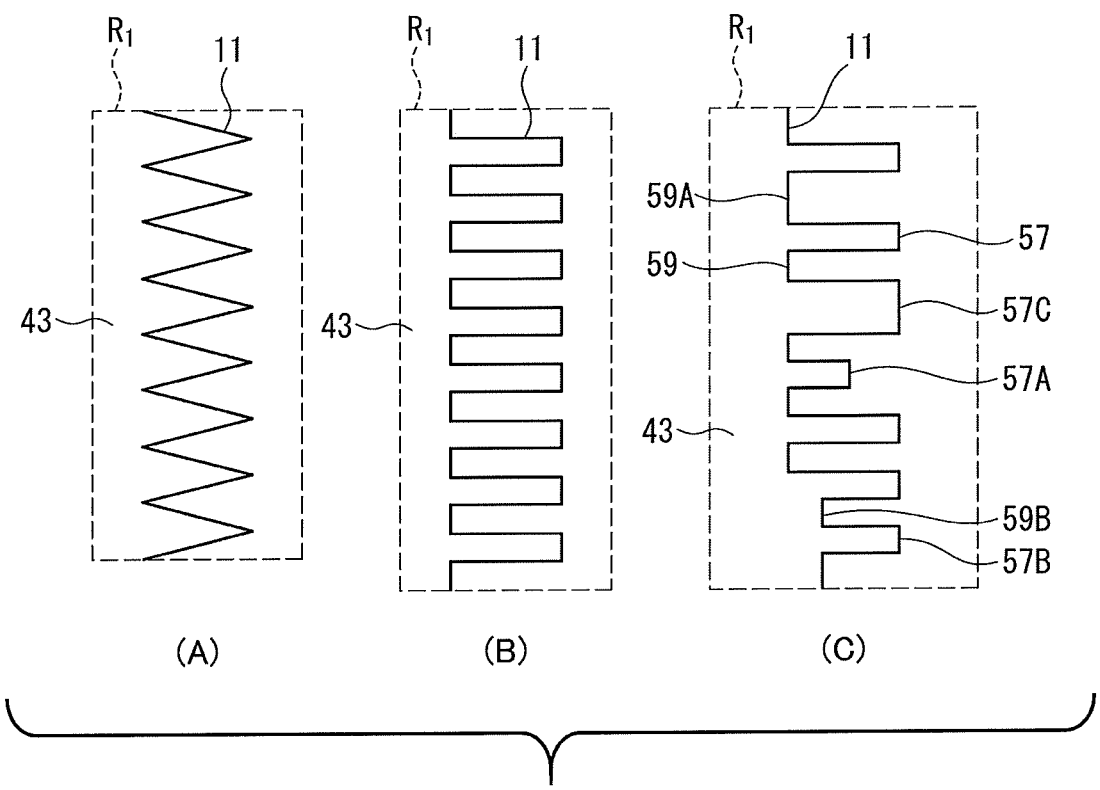
FIG. 6 includes views illustrating modified examples of the planar shape of an end portion of a decorative layer in the decorative layer-attached transparent plate according to the embodiment of the present invention.

In the case where the planar shape of the end portion 43 of the decorative layer 3 is formed in the waveform, a shape of the wave may be a triangular wave as illustrated in (A) of FIG. 6 and may be a rectangular wave as illustrated in (B) of FIG. 6. Even in any shape, regions with low visible light transmittance and regions with high visible light transmittance alternately and periodically appear at the end portion 43, corresponding to the shape of the wave. Therefore, the boundary between the transparent plate 2 and the decorative layer 3 looks blurred in human eyes.

Therefore, the color difference at the boundary between the transparent plate 2 and the decorative layer 3 is reduced spontaneously, and becomes inconspicuous.

Incidentally, even in the case of a triangular wave as illustrated in (A) of FIG. 6, the tip ends of its protrusion portion and recess portion will be practically a curved form in a strict sense. Therefore, the protrusion tangent and recess tangent in the case of a triangular wave can be defined in the same manner as in the case of a sine wave as described above.

In the case where the waveform is regarded as a set of the protrusions 57, as protrusions 57A and 57B of the end portion 43 of the decorative layer 3 illustrated in (C) of FIG. 6, the height may be different from those of the other protrusions 57.

In the case where the waveform is regarded as a set of the recesses 59, as recess 59B illustrated in (C) of FIG. 6, the depth thereof may be different from those of the other recesses 59.

In the case where the waveform is regarded as the set of the protrusions 57, as protrusion 57C illustrated in (C) of FIG. 6, the full width at half maximum thereof may be different from those of the other protrusions 57.

In the case where the waveform is regarded as the set of the recesses 59, as the recess 59A illustrated in (C) of FIG. 6, the full width at half maximum thereof may be different from those of the other recesses 59.

Figure 7:
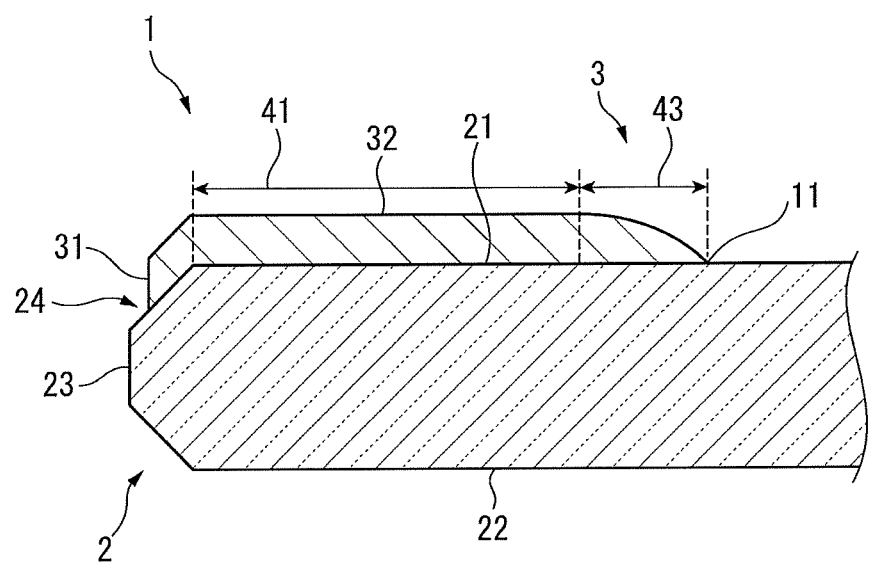
FIG. 7 is a longitudinal cross-sectional view of a modified example of a decorative layer-attached transparent plate according to the embodiment of the present invention.

As illustrated in FIG. 7, the thickness of the end portion 43 of the decorative layer 3 may become thinner toward the decorative layer end face 11. In FIG. 7, the contour of the end portion 43 in a cross-sectional view is a curved line, but may be a straight line.

In this structure, the transmittance increases toward the decorative layer end face 11 side and the color difference at the boundary between the transparent plate 2 and the decorative layer 3 is reduced spontaneously. The color difference becomes more inconspicuous.

The number of the protrusions 57 and the recesses 59 is not particularly limited. As illustrated in a region $R_2$ illustrated in FIG. 8, only one the recess 59 may be formed.

Figure 9:
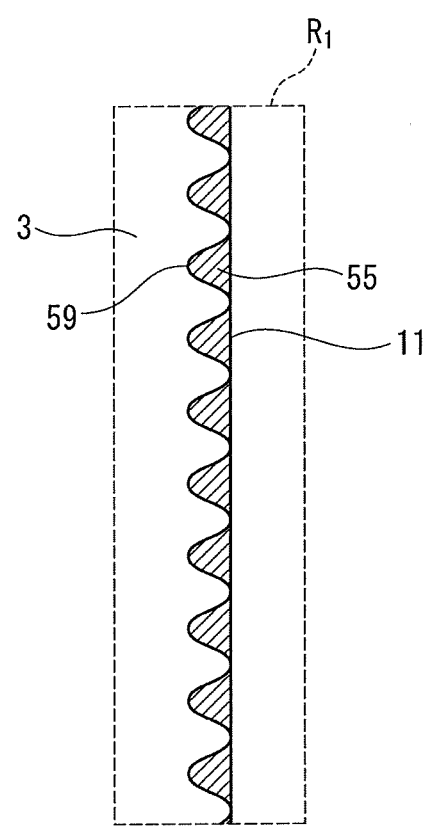
FIG. 9 is a view illustrating a modified example of the planar shape of the end portion of the decorative layer in the decorative layer-attached transparent plate according to the embodiment of the present invention.

In the case where the decorative layer 3 is regarded as the set of the recesses 59, as illustrated in FIG. 9, the decorative layer-attached transparent plate 1 may include an additional region 55 to fill the recesses 59. The additional region 55 is a region having higher visible light transmittance than that of the decorative layer 3. In the case where the additional region 55 is provided, the color difference at the boundary between the transparent plate 2 and the decorative layer 3 can be reduced while making the decorative layer end face 11 of the decorative layer 3 linear in plan view.

In the case where the decorative layer 3 has a frame shape, the protrusions 57 or the recesses 59 may be provided on the outer peripheral side.

The decorative layer-attached transparent plate 1 of the present invention can be used for a display device cover member such as a cover glass of a panel display such as a liquid crystal display or an organic EL display, a cover glass of an on-vehicle information equipment, and a cover glass of a portable equipment. In the case where the decorative layer-attached transparent plate 1 of the present invention is used for a display device cover, a targeted object can be protected while ensuring visibility. In addition, the color difference at the boundary between the transparent plate 2 and the decorative layer 3 of the cover member can be reduced, and the display device excellent in aesthetic appearance can be provided.

In the case where the decorative layer-attached transparent plate 1 is used in the display device, the decorative layer 3 preferably has a color corresponding to a color when the display device is in a non-display state. For example, in the case where the color in the non-display state is black, the decorative layer 3 is also preferably black.

There may be a case where the color and physical properties which are required for the decorative layer 3 cannot be compatible with each other. Even in such a case, since the color difference at the boundary between the transparent plate 2 and the decorative layer 3 is reduced by the protrusions 57 and the recesses 59, there is no possibility of impairing the aesthetic appearance of the display device due to the color of the decorative layer 3.

The decorative layer 3 of the decorative layer-attached transparent plate 1 of the present invention may form a pattern of an article in which the decorative layer-attached transparent plate 1 is used, to improve the design of the article.

Here, an example of the display device including the decorative layer-attached transparent plate 1 will be described.

Figure 10:
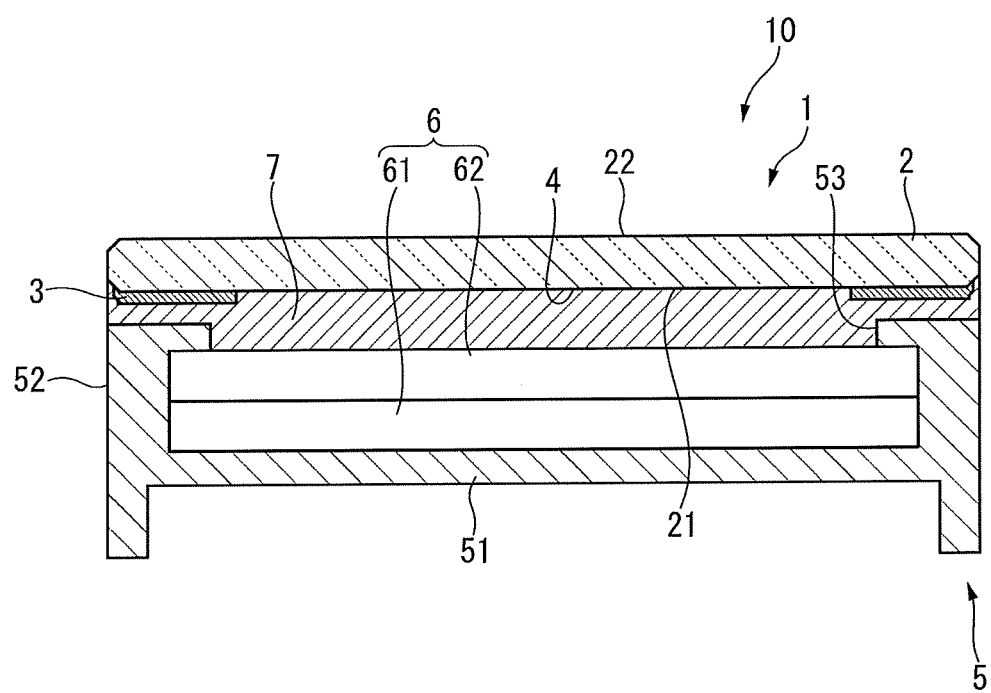
FIG. 10 is a partial cross-sectional view of a display device including the decorative layer-attached transparent plate.

A display device 10 illustrated in FIG. 10 includes a frame 5. The frame 5 includes a bottom portion 51, a side wall portion 52 intersecting the bottom portion 51, and an opening portion 53 facing the bottom portion 51. A liquid crystal module 6 is disposed in a space surrounded by the bottom portion 51 and the side wall portion 52. The liquid crystal module 6 includes a backlight 61 disposed on a bottom portion 51 side and a liquid crystal panel (display panel) 62 disposed on the backlight 61.

In addition, the decorative layer-attached transparent plate 1 is provided on an upper end of the frame 5 such that the first main surface 21 faces a liquid crystal module 6 side. In the decorative layer-attached transparent plate 1, the decorative layer 3 is bonded to the frame 5, and a part of the decorative layer 3 and a display region 4 of the first main surface 21 are bonded to the liquid crystal module 6, via an adhesive layer 7 provided on the upper end surface of the opening portion 53 and the side wall portion 52.

It is preferable that the adhesive layer 7 is transparent similar to the transparent plate 2 and has a small refractive index difference from that of the transparent plate 2.

Examples of the adhesive layer 7 include a layer formed of a transparent resin obtained by curing a liquid curable resin composition. Examples of the curable resin composition include a photocurable resin composition and a thermosetting resin composition. Among these, the photocurable resin composition containing a curable compound and a photopolymerization initiator is preferable. The curable resin composition is applied by using a method, for example, die coater or roll coater to form a curable resin composition film.

The adhesive layer 7 may be an optical clear adhesive film (OCA film, OCA tape). In this case, the OCA film may be bonded on the first main surface 21 side of the decorative layer-attached transparent plate 1.

A thickness of the adhesive layer 7 is preferably 5 μm or more and 400 μm or less and more preferably 50 μm or more and 200 μm or less. A storage shear modulus of elasticity of the adhesive layer 7 is preferably 5 kPa or more and 5 MPa or less and more preferably 1 MPa or more and 5 MPa or less.

In manufacturing the display device 10, the assembly order is not particularly limited. For example, a structure body in which the adhesive layer 7 is disposed on the decorative layer-attached transparent plate 1 in advance may be prepared and may be disposed on the frame 5, thereafter, the liquid crystal module 6 may be bonded thereto.

The display device 10 may include a touch sensor and the like. In the case of incorporating the touch sensor, the touch sensor is disposed on the first main surface 21 side of the decorative layer-attached transparent plate 1 via another adhesive layer (not illustrated) and the liquid crystal module 6 is disposed thereon via the adhesive layer 7.

EXAMPLE

Next, Examples of the present invention will be described. The present invention is not limited to the following Examples.

A glass plate (Dragon Trail (registered trademark), manufactured by Asahi Glass Co., Ltd) having a thickness of 2 mm and a quadrangle main surface was used as the transparent plate 2, and a decorative layer-attached glass was obtained in the following procedure.

Example 1

The glass plate was subjected to treatments of (1) an anti-glare treatment, (2) an end face grinding treatment, (3) a chemical strengthening treatment and an alkali treatment, and (4) a decorative layer formation, in the order. Specific treatments are as follows.

(1) Anti-Glare Treatment

The second main surface 22 of the glass plate was subjected to an anti-glare treatment by a frost treatment in the following procedure.

First, an acid-resistant protective film (hereinafter simply referred to as "protective film") was bonded to a main surface (first main surface 21) of the glass plate on a side not subjected to the anti-glare treatment. The resultant glass plate was immersed in an aqueous solution of 3% by mass of hydrogen fluoride for 3 minutes. Then, the glass plate was etched to remove contaminants adhered to the second main surface 22 of the glass plate. Subsequently, the glass plate was immersed in a mixed aqueous solution of 15% by mass of hydrogen fluoride and 15% by mass of potassium fluoride for 3 minutes, to thereby carry out a frost treatment on the second main surface 22 of the glass plate. Thereafter, the glass plate was immersed in an aqueous solution of 10% by mass of hydrogen fluoride for 6 minutes, to thereby carry out an anti-glare treatment. The protective film of the glass plate was removed and a haze value was measured to be 25%. The haze value was measured by using a haze meter (trade name: HZ-V3, manufactured by Suga Test Instruments Co., Ltd.) in accordance with JIS K 7136: 2000.

(2) End Face Grinding Treatment

The glass plate subjected to the anti-glare treatment was cut into a size of 150 mm×250 mm. Thereafter, C chamfering was carried out over the entire periphery of the glass plate with a dimension of 0.2 mm from the end face of the glass. The chamfering was carried out by using a #600 grinding stone (manufactured by Tokyo Diamond Co., Ltd.) at a rotation speed of the grinding stone of 6,500 rpm at a moving speed of the grinding stone of 5,000 mm/min. After chamfering, an arithmetic surface roughness Ra of the end face was 450 nm.

(3) Chemical Strengthening Treatment and Alkali Treatment

Next, the glass plate was immersed for 2 hours in a molten salt obtained by melting potassium nitrate by heating to 450° C., to thereby carry out a chemical strengthening treatment. Thereafter, the glass plate was drawn out from the molten salt, gradually cooled to 90° C. over 1 hour and then, allowed to stand in a room of 25° C. In the above treatments, a chemically strengthened glass plate having a surface compressive stress (CS) of 730 MPa and a depth of a stress layer (DOL) of 30 µm was obtained.

Furthermore, the resultant glass plate was immersed in an alkaline solution (trade name: Sunwash TL-75, manufactured by Lion Corporation) for 4 hours, to thereby carry out an alkali treatment.

(4) Decorative Layer Formation

A frame-shape decorative layer 3 having a width of 2 cm and an average thickness of 3.5 µm was formed on the outer peripheral portion of the first main surface 21 of the glass plate.

The decorative layer 3 was formed by using an ink jet device. An ink jet nozzle (model #1001, manufactured by Xaar plc.) was fixed to a frame and a discharge port of the ink jet nozzle was made to face downward such that an ink was applied in the vertical direction. As for the glass plate, the second main surface 22 was gripped by another frame and the first main surface 21 was used as a printing surface. A distance between the discharge port of the ink jet nozzle and the first main surface 21 was set to be 0.8 mm to 2 mm. In addition, the position and an angle of the glass plate were adjusted such that a normal direction of the first main surface 21 and a discharge direction (this case, the vertical direction) of the ink jet nozzle were substantially on the same straight line (almost on the same plane). A thermosetting black ink was used as the ink.

First, before forming the decorative layer 3, a corona treatment was carried out on the first main surface 21 of the glass plate for 1 to 30 seconds so as to control a contact angle of the first main surface 21 with respect to water being 5° or less. Thereafter, printing was started to form a lower side decorative layer 63 on the first main surface 21. At this time, the glass plate was moved with respect to the ink jet nozzle at a speed of 10 mm/sec. Similarly, an upper side decorative layer 60 was formed.

Subsequently, a left side decorative layer 67 and a right side decorative layer 65 were formed.

At this time, the end portion 43 of the left side decorative layer 67 was formed to have a waveform by such a manner that the printing pitch was set to 50% to 70% and the discharge amount of the ink was also reduced to 30% to 50% in terms of the volume ratio as compared with the upper side decorative layer 60 not forming a waveform.

Figure 11:
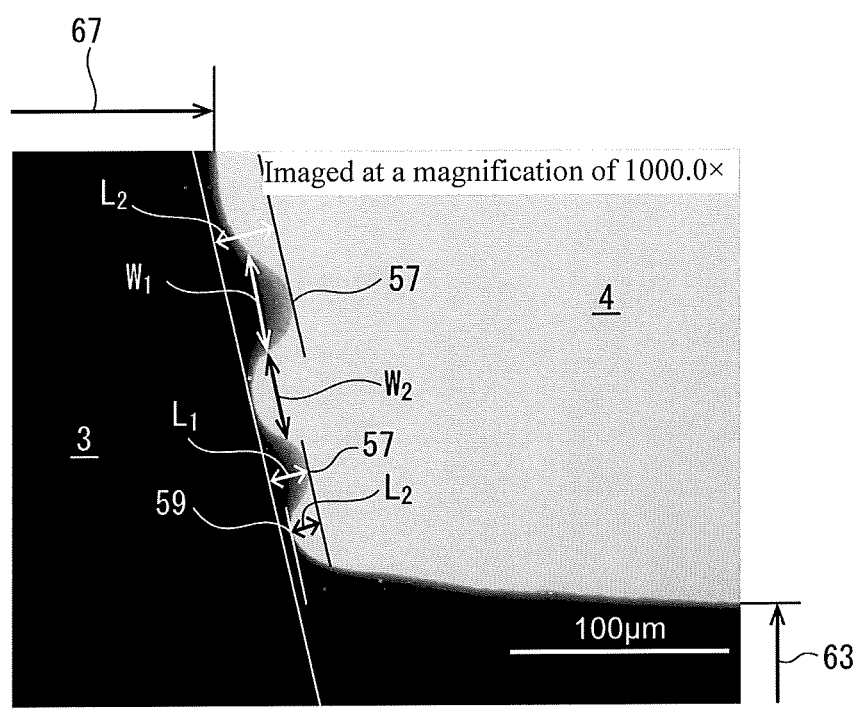
FIG. 11 is an enlarged view of a decorative layer-attached transparent plate in the vicinity of an end face of the decorative layer, in an Example of the present invention.

The enlarged view of the inner peripheral end portion of the end portion 43 of the left side decorative layer 67 was shown in FIG. 11. The protrusions 57 or the recesses 59 were formed on the inner periphery of the decorative layer 3. The height $L_1$ of the protrusion 57 or the depth $L_2$ of the recess 59 was approximately 20 µm to 30 µm. The full width at half maximum $W_1$ of the protrusion 57 or the full width at half maximum $W_2$ of the recess 59 was approximately 30 µm to 50 µm.

From the results, it was found that the protrusions 57 or the recesses 59 as illustrated in FIG. 3 can be formed by using the ink jet device. The vicinity of the end portion of the formed decorative layer 3 was observed to be blurred.

Example 2

Figure 8:
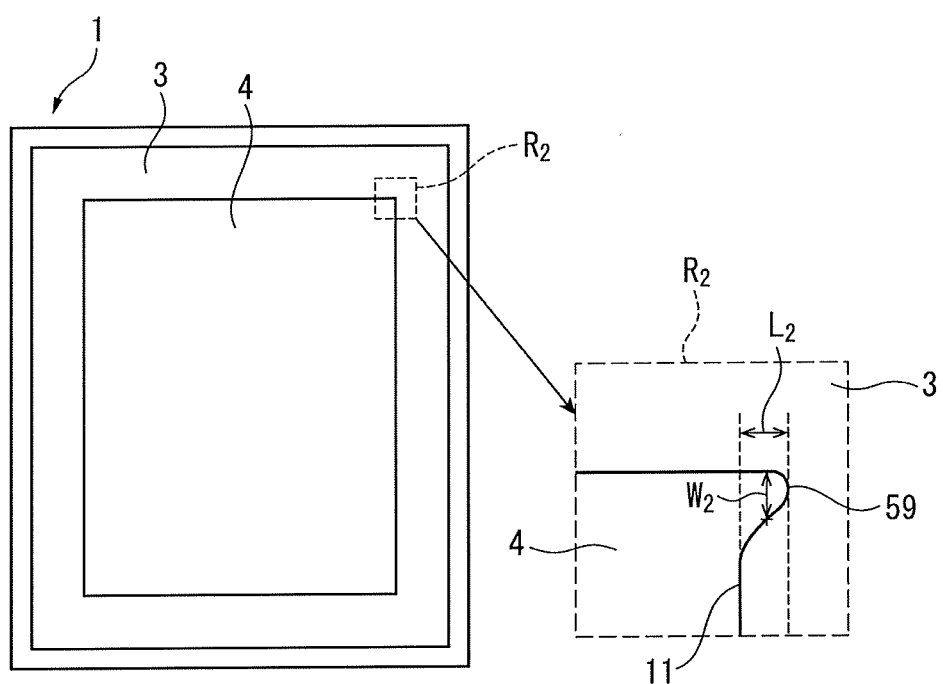
FIG. 8 includes a plan view of a modified example and an enlarged view of a region $R_2$ in the plan view, in the decorative layer-attached transparent plate according to the embodiment of the present invention.

As illustrated in FIG. 8, only a recess 59 was formed in the vicinity of the inner peripheral corner portion (right upper end portion of the right side decorative layer 65) of the frame in the same manner as in Example 1, except that in (4) decorative layer formation, similarly to Example 1, the printing conditions at a portion forming the waveform was changed such that the printing pitch was narrowed to 50% to 70% and the discharge amount of the ink was also reduced to 30% to 50% in terms of the volume ratio as compared with the other portion not forming a waveform.

Figure 12:
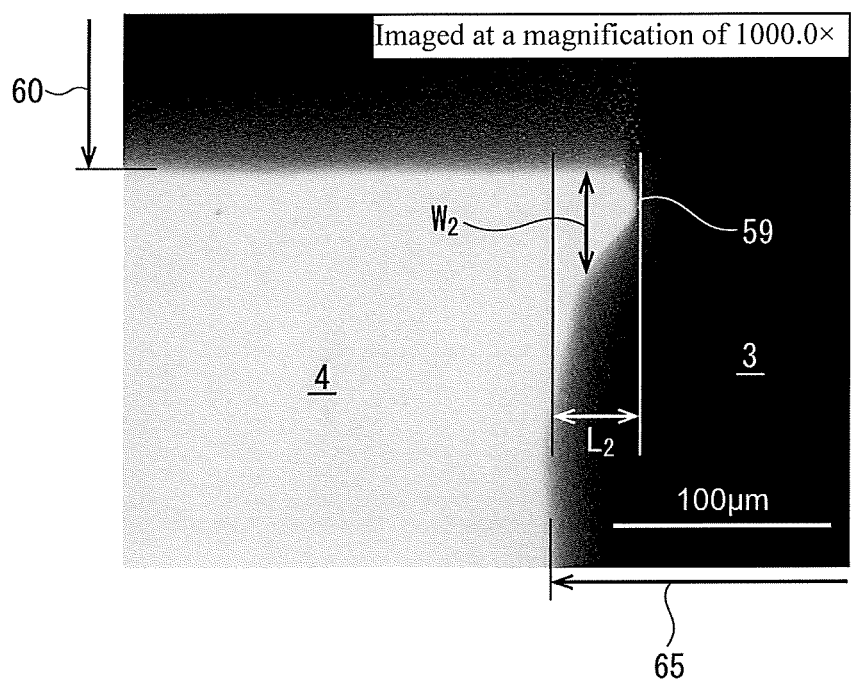
FIG. 12 is an enlarged view of a decorative layer-attached transparent plate in the vicinity of an end face of the decorative layer, in another Example of the present invention.

The enlarged view of the inner peripheral corner portion was shown in FIG. 12. In the vicinity of the inner peripheral corner portion of the decorative layer 3, only the recess 59 was formed, the depth $L_2$ was 39 µm, and the full width at half maximum $W_2$ was approximately 100 to 120 µm. From the results, it was found that the recess 59 can be formed by using the ink jet device. The vicinity of the waveform formed portion of the formed decorative layer 3 was observed to be blurred.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2017-127579 filed on Jun. 29, 2017, and the contents are incorporated herein by reference.

DESCRIPTION OF REFERENCE NUMERALS AND SIGNS

1 Decorative layer-attached transparent plate
2 Transparent plate
3 Decorative layer
6 Liquid crystal module
7 Adhesive layer
10 Display device
21 First main surface
22 Second main surface

The invention claimed is:

1. A decorative layer-attached transparent plate comprising:
   a transparent plate which is formed of a visible light-transmitting material and has two main surfaces; and
   a decorative layer provided on one of the main surfaces, wherein the decorative layer is a printed layer and comprises a protrusion having a full width at half maximum of 20 μm or more and 200 μm or less and a height of 20 μm or more and 100 μm or less at an end portion of the decorative layer, in plan view as viewed from the one of the main surfaces.

2. The decorative layer-attached transparent plate according to claim 1,
wherein the decorative layer comprises the protrusion in a plurality.

3. The decorative layer-attached transparent plate according to claim 1,
wherein in the plan view, when a protrusion tangent is drawn to a peak of the protrusion, and among tangents which are drawn to the decorative layer and parallel to the protrusion tangent, and a tangent having a contact point with the decorative layer closest to the peak of the protrusion is taken as a protrusion-adjacent tangent,
a shortest distance between the protrusion tangent and the protrusion-adjacent tangent is 20 μm or more and 100 μm or less, and
the full width at half maximum of the protrusion is 20 μm or more and 200 μm or less with respect to the shortest distance.

4. The decorative layer-attached transparent plate according to claim 2,
wherein a recess formed between the protrusions has a full width at half maximum of 20 μm or more and 200 μm or less and a depth of 20 μm or more and 100 μm or less.

5. The decorative layer-attached transparent plate according to claim 4,
wherein in the plan view, when a recess tangent is drawn to a peak of the recess, and among tangents which are drawn to the decorative layer and parallel to the recess tangent, and a tangent having a contact point with the decorative layer closest to the peak of the recess is taken as a recess-adjacent tangent,
a shortest distance between the recess tangent and the recess-adjacent tangent is 20 μm or more and 100 μm or less, and
the full width at half maximum of the recess is 20 μm or more and 200 μm or less with respect to the shortest distance.

6. The decorative layer-attached transparent plate according to claim 1,
wherein the decorative layer has a planar shape of a waveform.

7. The decorative layer-attached transparent plate according to claim 6,
wherein the planar shape of the waveform has an amplitude of one cycle of 20 μm or more and 100 μm or less.

8. The decorative layer-attached transparent plate according to claim 6,
wherein the planar shape of the waveform has a half-wavelength of one cycle of 20 μm or more and 200 μm or less.

9. The decorative layer-attached transparent plate according to claim 6,
wherein the planar shape of the waveform is any one of a sine wave, a triangular wave, and a rectangular wave.

10. The decorative layer-attached transparent plate according to claim 1,
wherein a thickness of the decorative layer becomes thinner toward an end face side.

11. The decorative layer-attached transparent plate according to claim 1,
wherein the decorative layer has a planar shape of frame, and the end portion of the decorative layer is an inner circumference or an outer circumference of the frame.

12. The decorative layer-attached transparent plate according to claim 4, further comprising:
an additional region which is configured to fill the recess of the decorative layer in the plan view and has a higher visible light transmittance than that visible light transmittance of the decorative layer.

13. The decorative layer-attached transparent plate according to claim 1,
wherein the transparent plate is a cover glass for a display device and the decorative layer has a color corresponding to a color of the display device in a non-display state.

14. The decorative layer-attached transparent plate according to claim 1,
wherein the transparent plate is made of glass.

15. The decorative layer-attached transparent plate according to claim 14,
wherein the glass is a bent glass.

16. The decorative layer-attached transparent plate according to claim 14,
wherein the glass is a strengthened glass.

17. A display device comprising:
the decorative layer-attached transparent plate as described in claim 1,
a display panel, and
an adhesive layer bonding the decorative layer-attached transparent plate and the display panel.

18. The decorative layer-attached transparent plate according to claim 1,
wherein the decorative layer is formed by an ink jet method.

19. A decorative layer-attached transparent plate comprising:
a transparent plate which is formed of a visible light-transmitting material and has two main surfaces; and
a decorative layer provided on one of the main surfaces,
wherein the decorative layer has a planar shape of a waveform which is any one of a sine wave, a triangular wave, and a rectangular wave, such that the decorative layer comprises at least one of a protrusion and a recess at an end portion of the decorative layer, in plan view as viewed from the one of the main surfaces.

20. A decorative layer-attached transparent plate comprising:
a transparent plate which is formed of a visible light-transmitting material and has two main surfaces; and
a decorative layer provided on one of the main surfaces,
wherein the decorative layer comprises at least one of a protrusion and a recess at an end portion of the decorative layer, in plan view as viewed from the one of the main surfaces, and a thickness of the decorative layer becomes thinner toward an end face side.

* * * * *